(12) United States Patent
Hong et al.

(10) Patent No.: US 7,562,433 B2
(45) Date of Patent: Jul. 21, 2009

(54) METHOD FOR PRODUCING METAL NANOFIBERS, YARNS AND TEXTILES

(75) Inventors: Seung Hong, New Providence, NJ (US);
William G. Marancik, Ebony, VA (US);
Jeff Parrell, Roselle Park, NJ (US);
Michael Field, Jersey City, NJ (US);
Kenneth Marken, Cranford, NJ (US);
Youzhu Zhang, East Brunswick, NJ (US)

(73) Assignee: Oxford Superconducting Technology, Carteret, NJ (US)

( * ) Notice: Subject to any disclaimer, the term of this patent is extended or adjusted under 35 U.S.C. 154(b) by 487 days.

(21) Appl. No.: 11/235,705

(22) Filed: Sep. 26, 2005

(65) Prior Publication Data

US 2007/0234545 A1    Oct. 11, 2007

Related U.S. Application Data

(60) Provisional application No. 60/614,219, filed on Sep. 29, 2004.

(51) Int. Cl.
*H01L 39/24* (2006.01)
*B23P 17/00* (2006.01)

(52) U.S. Cl. .......................... 29/599; 29/419.1; 29/424; 505/230; 505/430; 505/434; 977/762; 977/840; 977/888

(58) Field of Classification Search .............. 29/599, 29/419.1, 4, 24; 505/230, 430, 434; 977/762, 977/765, 810, 840, 888, 961
See application file for complete search history.

(56) References Cited

U.S. PATENT DOCUMENTS 4,109,374 A * 8/1978 Whetstone et al. ............ 29/599
4,148,129 A    4/1979 Young
4,411,712 A    10/1983 Marancik
4,863,804 A * 9/1989 Whitlow et al. .............. 428/555
4,959,279 A * 9/1990 Tanaka et al. ............... 428/660

(Continued)

OTHER PUBLICATIONS

W. Marancik and K. Marken, Manufacture of Low Tc Superconductor Wire, Nonferrous Wire Handbook, vol. 3: Principles and Practice, 1995, p. 299-307, The Wire Association International, Guilford, CT.

*Primary Examiner*—Jermie E Cozart
(74) *Attorney, Agent, or Firm*—Klauber & Jackson, LLC

(57) ABSTRACT

A method for fabrication of nanometer scale metal fibers, followed by optional further processing into cables, yarns and textiles composed of the primary nanofibers. A multicomponent composite is first formed by drilling a billet of matrix metal, and inserting rods of the metal desired as nanofibers. Hexed or round rods can also be inserted into a matrix metal can. The diameter of this composite is then reduced by mechanical deformation methods. This composite is then cut to shorter lengths and reinserted into another billet of matrix metal, and again the diameter is reduced by mechanical deformation. This process of large scale metal stacking followed by mechanical deformation is repeated until the desired fiber size scale is reached, the fibers being contained in the matrix metal. After size reduction, the composite metal wires may be further processed into built up configurations, depending on intended application, by stranding, cabling, braiding, weaving, knitting, felting, etc., to form yarns or textiles. After the built up configuration is formed, the matrix metal is removed by chemical etching, leaving a cable, yarn or textile composed of the primary nanofibers.

14 Claims, 2 Drawing Sheets

U.S. PATENT DOCUMENTS

| | | | |
|---|---|---|---|
| 4,973,365 A * | 11/1990 | Ozeryansky et al. | 148/98 |
| 5,088,183 A * | 2/1992 | Kanithi | 29/599 |
| 6,112,395 A * | 9/2000 | Quick et al. | 29/419.1 |
| 6,497,029 B1 * | 12/2002 | Quick et al. | 29/419.1 |
| 6,684,486 B1 * | 2/2004 | Willen | 29/599 |
| 6,936,496 B2 * | 8/2005 | Meyer et al. | 438/99 |
| 2001/0003627 A1 * | 6/2001 | Amamoto | 428/606 |

* cited by examiner

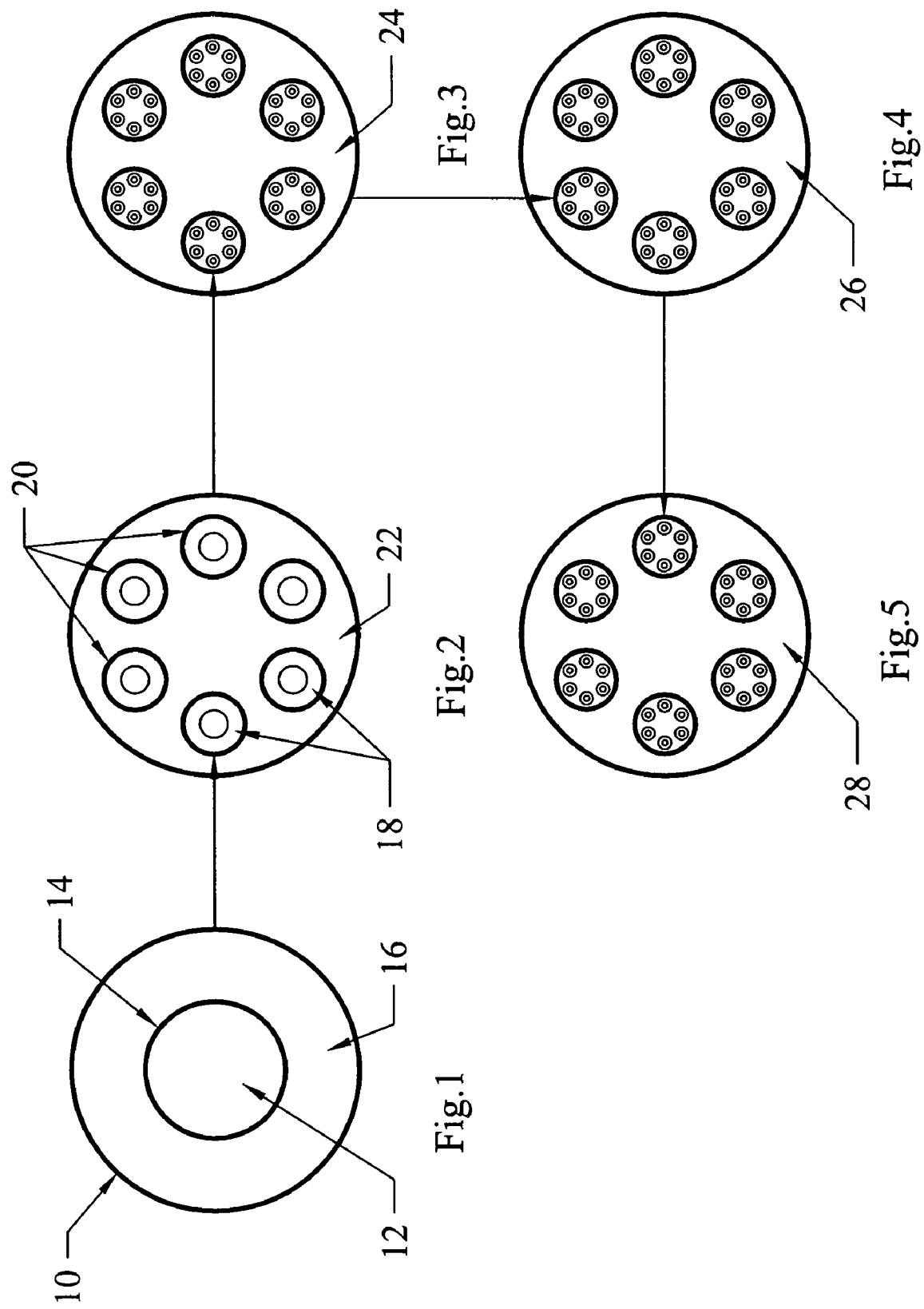

METHOD FOR PRODUCING METAL NANOFIBERS, YARNS AND TEXTILES

RELATED APPLICATION

This application claims priority from U.S. Provisional Applications Ser. No. 60/614,219, filed Sep. 29, 2004.

FIELD OF INVENTION

This invention relates generally to methods for metal fabrication, and more specifically relates to fabrication of nanometer scale metal fibers and to processing of such fibers into cables, yarns, textiles and the like composed of the primary nanofibers.

BACKGROUND OF THE INVENTION

The present invention relates to methods for fabrication of metal nanofibers, by using large scale stacking of metal components and mechanical deformation techniques. It further describes methods of integrating these primary nanofibers into more complex articles including cables, yarns and textiles.

Technology relating to nanoscale materials has become an increasingly important area for technical development, and remains under broad scrutiny for scientific, commercial, and military applications. There are unique physical properties of materials at this scale, and a wide range of potential applications proposed to take advantage of these unique properties. Potential market applications for this technology include smart filters for medical, biological and chemical purposes; electric textiles that power sensors, electronics, and communications gear; and improved military garb using more flexible and stronger body armor.

Although nanofibers of metal, carbon, and other inorganic materials have been fabricated, these have typically used atomic scale methods which build up the fibers one atom or atomic layer at a time. These methods are slow, tedious, and extremely expensive. The aforementioned applications all require substantial quantities of fabric or cable, and presently known technologies are too slow and expensive to meet these needs.

However, large scale industrial methods exist for processing micrometer scale metal fiber composites, for example in multifilamentary superconductors. The present invention builds on this prior art of micrometer scale filamentary composites, and extends it to nanometer scale fiber composites. In addition it combines selective metal extraction through chemical etching with the prior art superconductor composite technology to extract nanofibers from the composite metal articles.

It is therefore an object of the present invention to extend large scale multifilamentary composite processing from the prior art of micrometer scale filaments to nanometer scale fibers, which can thereby be produced in sufficient quantity and length to enable their commercial viability.

It is a further object of the invention to provide a method of chemical extraction of these nanofibers by etching.

An additional object of the invention is the integration of these extracted fibers into forms which can be directly applied, such as cables, yarns, and textiles.

SUMMARY OF INVENTION

In accordance with the present invention a method is provided for fabrication first of nanometer scale metal fibers, followed by further processing into cables, yarns and textiles composed of the primary nanofibers. A multicomponent composite is first formed by drilling a billet of matrix metal, and inserting rods of the metal desired as nanofibers. The diameter of this composite is then reduced by mechanical deformation methods including extrusion, swaging, and wire drawing. This composite is then cut to shorter lengths and reinserted into another billet of matrix metal, and again the diameter is reduced by mechanical deformation. This process of large scale metal stacking followed by mechanical deformation is repeated until the desired fiber size scale is reached, the fibers being contained in the matrix metal. After size reduction, the composite metal wires may be further processed into built up configurations, depending on intended application, by stranding, cabling, braiding, weaving, knitting, felting, etc., to form yarns or textiles. After the built up configuration is formed, the matrix metal is removed by chemical etching, leaving a cable, yarn or textile composed of the primary nanofibers.

BRIEF DESCRIPTION OF DRAWINGS

In the drawings:

FIGS. 1 through 5 schematically illustrate use of the invention in fabrication of nanofibers in a copper matrix.

DESCRIPTION OF THE PREFERRED EMBODIMENT

Figure 6:
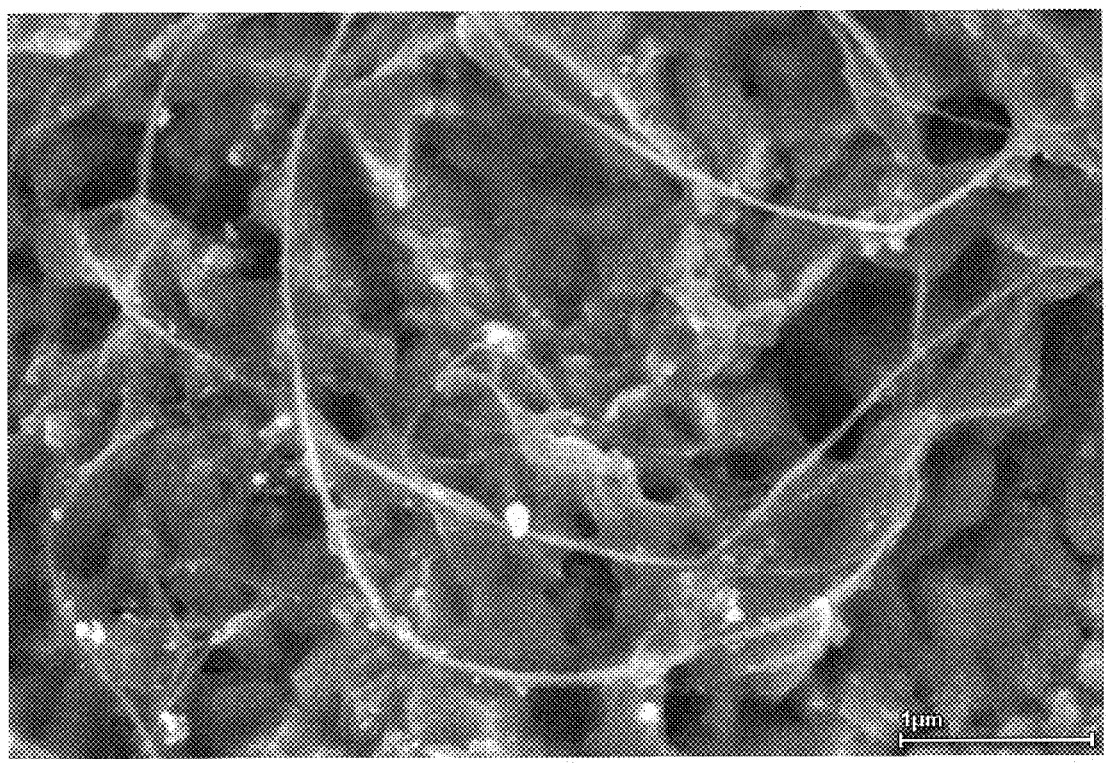
FIG. 6 is a scanning electron micrograph showing the size scale of gold filaments etched from a copper matrix after multiple extrusion-draw-restack sequences.

The present invention extends large scale multifilamentary composite processing from the prior art of micrometer scale filaments to nanometer scale fibers which can be produced in sufficient quantity and length to enable their commercial viability. The starting billet size can be varied depending on quantity of nanofibers desired and the deformation tools available, but is generally in the range from 1" to 12" diameter and from 6" to 36" long.

The material selected for the nanofibers may be a wide range of metals and alloys, depending on application and desired properties, with preference given to metals with good ductility and tolerance for extensive cold work. The material selected for the matrix billet may be a wide range of metals and alloys, with preference given to metals with good ductility and tolerance for extensive cold work and also for the opportunity for removal etching without attacking the nanofiber material.

In one preferred embodiment, rods of appropriate size, typically in the range 0.2 to 1" diameter, are fabricated from the metal selected for the nanofibers and inserted into a billet. In this preferred embodiment, the first deformation step for each billet stage is extrusion with a diameter reduction ratio of at least 3 in order to achieve metallic bonding of the starting components. In order to limit interdiffusion and alloying of the starting metals, cold hydrostatic extrusion is preferred for this step, with a maximum extrusion temperature of 250° C. After extrusion, the preferred deformation method is cold wire drawing, although other methods such as swaging or groove rolling can be used. This drawing or other deformation is continued down to a suitable size for restacking into a subsequent billet, either by insertion into drilled holes in the next matrix billet, or by restacking hex or round rods and inserting bundles of the rods into a matrix metal can. This process of stacking, deformation, and restacking is repeated until sufficient total reduction strain is obtained to achieve the desired nanofiber diameter.

If bundles of nanofibers are desired, then matrix removal of the final wire can be accomplished by etching of the wire at the desired size. In a demonstration example, a 50% nitric acid mixture removes the copper matrix from the gold nanofibers. With other material combinations care is taken to use an appropriate acid to selectively remove the matrix without attacking the fibers.

If integrated structures of nanofibers are desired, such as cables, yarns, or textiles, then the final billet is deformed to a sufficiently small diameter that the wire can be cabled, plied, woven, or felted, depending on the desired final configuration of nanofibers. In this case the integrative step is performed and then the removal etch to release the nanofibers from the matrix. With such structures, an optional step is the polymer impregnation of the, fibers to add strength and to better maintain the position of fibers within the structures.

FIGS. 1 through 5 schematically illustrate, by way of example, the fabrication of gold nanofibers in a copper matrix. FIG. 1 shows the cross section of an initial composite 10, containing a rod 12 of gold which is inserted into a drilled hole 14 in a copper billet 16. After extrusion and wire drawing, this initial monocore composite is reduced to a rod 18 of suitable dimensions for reinserting into multiple holes 20 in a second drilled copper billet 22, as illustrated in FIG. 2. This process can be repeated, as illustrated in FIGS. 3 through 5, and with each step the diameter of the starting gold metal is reduced in proportion to the sum of the reductions of the copper billets 16, 22, 24, 26 and 28. FIG. 6 is a scanning electron micrograph showing the size scale of gold filaments etched from a copper matrix after five extrusion-draw-restack sequences.

EXAMPLE

Multifilament composites of gold embedded in a copper matrix are attained using the method of the present invention for stacking, deforming, and restacking multiple times in sequence. A 0.1" diameter wire of 99.999% gold was inserted into a drilled hole in a 2.5" OD copper billet. This billet was sealed by welding copper ends to the billet, and then hydrostatically extruded to 0.75" diameter. This rod was wire drawn to 0.144" diameter, cut to 8.5" lengths, and 6 pieces inserted into drilled holes in a second copper billet 0.125" in diameter. This billet was sealed by welding copper ends to the billet, and then hydrostatically extruded to 0.5" diameter. The second stack was then wire drawn to 0.144" diameter, cut into 6 lengths, and stacked into a third copper billet 0.125" in diameter. The third billet was sealed, hydrostatically extruded to 0.5", wire drawn to 0.144" diameter, cut into 6 lengths, and stacked into a fourth copper billet 0.125" in diameter. The fourth billet was sealed, hydrostatically extruded to 0.5", wire drawn to 0.144" diameter, cut into 6 lengths, and stacked into a fifth copper billet 0.125" in diameter. The fifth billet was sealed, hydrostatically extruded to 0.5", and wire drawn to a range of wire sizes from 0.06" to 0.02". Samples at these sizes were etched in a nitric acid-water mixture to reveal the presence of gold nanofibers with diameters in the range 50 to 20 nm.

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

The invention claimed is:

1. A method of forming nanofibers of metals or metal alloys comprising the steps of: inserting rods comprising fiber metal or alloy into holes drilled into a matrix metal billet, mechanically deforming this billet to a rod of smaller size, then restacking these smaller rods into a subsequent matrix metal billet; and
   repeating the steps multiple times until the rods have been reduced to nanofibers of a desired diameter.

2. The method of forming nanofibers as in claim 1 wherein the restacked rods are round and inserted into drilled holes in the subsequent matrix metal billet.

3. The method of forming nanofibers as in claim 1 wherein the nanofibers are removed from the matrix metal by selectively etching the matrix using an acid that attacks the matrix but not the nanofiber.

4. A method in accordance with claim 1, further including forming integrated nanofiber structures by additional processing of nanofibers contained in wires produced, followed by stranding, cabling, braiding, wearing, knitting or felting to form yarns or textiles.

5. The method of forming integrated nanofiber structures as in claim 4, wherein the nanofibers are removed from the matrix metal by selectively etching the matrix using an acid that attacks the matrix but not the nanofibers.

6. The method of forming integrated nanofiber structures as in claim 5, wherein polymer impregnation is used to strengthen and immobilize the nanofibers in a nanofiber structure.

7. A method of forming nanofibers of metals or metal alloys comprising: forming rods of hexagonal or round cross-section wherein longitudinally extending nanofiber metal is encased within a surrounding matrix metal; bundling the said rods together and inserting them into a can of matrix metal to form a billet; mechanically deforming said billet to a rod of smaller size, then restacking a plurality of said smaller rods into a subsequent matrix metal billet; and repeating said restacking and deforming steps multiple times until the rods have been reduced to where the nanofibers are of a desired diameter.

8. A method in accordance with claim 7 wherein the nanofibers are removed from the matrix metal by selectively etching the matrix using an acid that attacks the matrix but not the nanofibers.

9. A method in accordance with claim 7, further including forming integrated nanofiber structures by additional processing of nanofibers contained in wires produced, followed by stranding, cabling, braiding, wearing, knitting or felting to form yarns or textiles.

10. A method in accordance with claim 9 wherein the nanofibers are removed from the matrix metal by selectively etching the matrix using an acid that attacks the matrix but not the nanofibers.

11. A method in accordance with claim 10, wherein polymer impregnation is used to strengthen and immobilize the nanofibers in a nonofiber structure.

12. A method in accordance with claim 1 or claim 7 wherein the metal or metal alloy is gold or a gold alloy.

13. A method in accordance with claim 1 or claim 7 wherein the matrix metal is copper or a copper alloy.

14. A method in accordance with claim 3 or claim 8 wherein the acid is nitric acid.

* * * * *